US012601257B2

(12) United States Patent
Elsorsar et al.

(10) Patent No.: US 12,601,257 B2
(45) Date of Patent: Apr. 14, 2026

(54) FLUID SAMPLER TOOL AND ASSOCIATED SYSTEM AND METHOD

(71) Applicant: WEATHERFORD TECHNOLOGY HOLDINGS, LLC, Houston, TX (US)

(72) Inventors: Ahmed Abdalla Elsorsar, Dubai (AE); Benoit Pinson, Gabon (AE); Blake L. Alfson, Houston, TX (US); Gadi Fishel, Katy, TX (US); Gary D. Ingram, Spring, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 136 days.

(21) Appl. No.: 17/066,339

(22) Filed: Oct. 8, 2020

(65) Prior Publication Data

US 2022/0112803 A1      Apr. 14, 2022

(51) Int. Cl.
| | |
|---|---|
| *E21B 49/08* | (2006.01) |
| *G01N 1/20* | (2006.01) |

(52) U.S. Cl.
CPC ........... *E21B 49/08* (2013.01); *G01N 1/2035* (2013.01)

(58) Field of Classification Search
CPC ...... E21B 49/08; E21B 49/10; E21B 49/0875; E21B 49/081; E21B 34/066; E21B 34/085; G01N 1/2035
See application file for complete search history.

(56) References Cited

U.S. PATENT DOCUMENTS

| | | | | | |
|---|---|---|---|---|---|
| 3,665,955 | A | * | 5/1972 | Conner, Sr. ............. | E21B 17/02 166/66.4 |
| 4,736,791 | A | * | 4/1988 | Rorden ................... | E21B 34/10 166/66.4 |
| 5,337,822 | A | * | 8/1994 | Massie ................... | E21B 49/082 166/321 |
| 5,375,658 | A | * | 12/1994 | Schultz ................. | E21B 34/066 166/66.4 |
| 6,047,239 | A | * | 4/2000 | Berger ................... | E21B 49/088 702/9 |
| 6,702,017 | B1 | * | 3/2004 | Corrigan ................. | E21B 36/04 73/152.28 |
| 7,243,536 | B2 | | 7/2007 | Bolze et al. | |
| 7,966,876 | B2 | | 6/2011 | Irani et al. | |
| 8,429,961 | B2 | | 4/2013 | Irani et al. | |
| 9,273,551 | B2 | | 3/2016 | Irani et al. | |
| 9,708,909 | B2 | | 7/2017 | Atkinson et al. | |

(Continued)

OTHER PUBLICATIONS

International Search Report with Written Opinion issued Jan. 7, 2022 for PCT Patent Application No. PCT/US2021/049560, 13 Pages.

(Continued)

*Primary Examiner* — Nicole Coy
*Assistant Examiner* — Nicholas D Wlodarski
(74) *Attorney, Agent, or Firm* — SMITH IP SERVICES, P.C.

(57) ABSTRACT

A method can include deploying into a well a fluid sampler tool including a fluid sampler, a sampler valve, a controller and a sensor, and the controller operating the sampler valve in response to a sensed well parameter being within a predetermined well parameter range. A fluid sampler tool can include a fluid sampler, a sampler valve, a controller and a carrier configured to connect the fluid sampler tool in a tubular string, the controller being enclosed within a chamber that is externally accessible on the carrier.

23 Claims, 15 Drawing Sheets

(56)                  References Cited

U.S. PATENT DOCUMENTS

|  |  |  |  |  |
|---|---|---|---|---|
| 9,771,796 | B2 | 9/2017 | Irani et al. | |
| 10,082,023 | B2 | 9/2018 | Khoo et al. | |
| 10,458,232 | B2 | 10/2019 | Villareal et al. | |
| 10,620,227 | B1 | 4/2020 | Wade | |
| 2009/0049904 | A1* | 2/2009 | Meister | E21B 49/10 73/152.23 |
| 2012/0018147 | A1* | 1/2012 | Niconoff | E21B 49/10 166/250.01 |
| 2012/0222852 | A1* | 9/2012 | Pelletier | E21B 49/10 417/282 |
| 2013/0014994 | A1* | 1/2013 | Sherrill | E21B 49/08 175/309 |
| 2013/0025855 | A1* | 1/2013 | Glattetre | E21B 49/08 166/69 |
| 2013/0043874 | A1* | 2/2013 | Clark | E21B 10/00 324/369 |
| 2013/0315024 | A1* | 11/2013 | Ringgenberg | B01F 33/452 366/144 |
| 2015/0107349 | A1* | 4/2015 | Badri | E21B 49/005 73/152.04 |
| 2015/0361791 | A1* | 12/2015 | Gisolf | E21B 49/008 166/264 |
| 2016/0069183 | A1* | 3/2016 | Khoo | E21B 49/081 166/162 |
| 2016/0215617 | A1* | 7/2016 | Samec | E21B 49/086 |
| 2016/0348499 | A1* | 12/2016 | Logan | E21B 47/135 |
| 2017/0260856 | A1 | 9/2017 | Crabeil et al. | |
| 2017/0275984 | A1* | 9/2017 | Wang | E21B 47/017 |
| 2018/0051560 | A1 | 2/2018 | Smarandache et al. | |
| 2019/0128117 | A1* | 5/2019 | Dumont | E21B 49/10 |
| 2019/0390548 | A1 | 12/2019 | Samec et al. | |
| 2020/0003054 | A1 | 1/2020 | Yuratich et al. | |
| 2020/0157936 | A1 | 5/2020 | Dybdahl et al. | |
| 2020/0232318 | A1* | 7/2020 | Fripp | E21B 47/16 |

OTHER PUBLICATIONS

European Examination Report issued Sep. 25, 2025 for EP Patent Application No. 21791509.9, 7 pages.
Australian Examination Report issued Dec. 4, 2025 for AU Patent Application No. 2021357044, 5 pages.

* cited by examiner

*80*

*82* DEPLOY SAMPLER TOOL INTO WELL

*84* MONITOR WELL PARAMETERS

*86* ACTUATE VALVE OPEN

*88* MONITOR WELL PARAMETERS

*90* ACTUATE VALVE CLOSED

*92* RETRIEVE SAMPLER TOOL TO SURFACE

FLUID SAMPLER TOOL AND ASSOCIATED SYSTEM AND METHOD

BACKGROUND

This disclosure relates generally to equipment utilized and operations performed in conjunction with a subterranean well and, in examples described below, more particularly provides for obtaining samples of fluid in a well.

A fluid sampler (also known as a fluid sample chamber) is used to obtain a sample of fluid in a well. It is many times desirable to obtain a fluid sample while it remains at well conditions downhole, rather than allow the fluid to flow to surface, since characteristics of the fluid can change when it cools and its pressure decreases.

Therefore, it will be readily appreciated that improvements are continually needed in the art of designing, constructing and utilizing fluid sampler tools. The present disclosure provides such improvements to the art. The improvements may be used with various well operations and well configurations in keeping with the principles of this disclosure.

DETAILED DESCRIPTION

Figure 1:
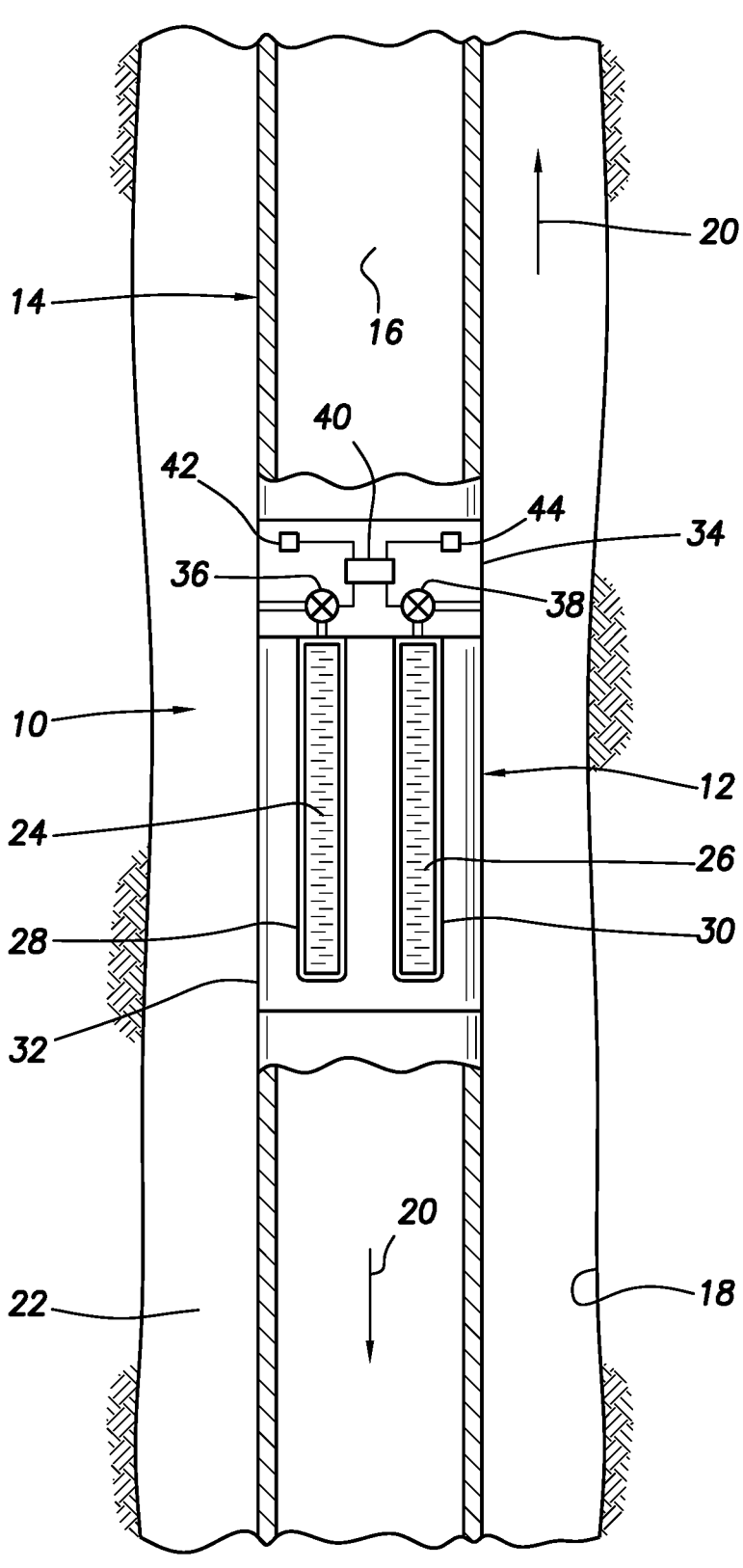
FIG. 1 is a representative partially cross-sectional view of an example of a well fluid sampling system and associated method which can embody the principles of this disclosure.

Representatively illustrated in FIG. 1 is a well fluid sampling system 10 and associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, the system 10 includes a fluid sampler tool 12 connected in a tubular string 14. A flow passage 16 extending longitudinally through the tubular string 14 also extends longitudinally through the fluid sampler tool 12.

In this example, the fluid sampler tool 12 is used in conjunction with a wellbore drilling operation. A wellbore 18 is drilled while a drilling fluid 20 is circulated through the flow passage 16 and an annulus 22 formed between the tubular string 14 and the wellbore. In some examples, a drill motor (not shown) may be activated by the flow of the fluid 20 through the flow passage 16 downstream of the fluid sampler tool 12.

However, it should be clearly understood that the scope of this disclosure is not limited to use of the fluid sampler tool 12 with a drilling operation. The fluid sampler tool 12 could instead be used with testing or other operations, whether or not drilling is performed. In addition, the scope of this disclosure is not limited to circumstances in which the fluid 20 is circulated in any particular direction through any particular flow path(s) in the system 10. It is not necessary for the fluid 20 to be drilling fluid or any other particular type of fluid.

The fluid sampler tool 12 may be used in a well testing operation known to those skilled in the art as a drill stem test. However, the fluid sampler tool 12 may be used with other types of operations in keeping with the principles of this disclosure.

As depicted in FIG. 1, the fluid sampler tool 12 is configured to obtain fluid samples 24, 26 from the annulus 22 after the fluid sampler tool has been deployed into the wellbore 18. Preferably, the fluid samples 24, 26 are obtained while they are maintained at ambient well conditions (such as, at downhole pressure and temperature).

The fluid samples 24, 26 are contained within respective fluid samplers 28, 30 of the fluid sampler tool 12. In this example, the fluid samplers 28, 30 are mounted externally on a carrier 32 of the fluid sampler tool 12. The fluid samplers 28, 30 can instead be internally mounted in other examples. Two of the fluid samplers 28, 30 are depicted in FIG. 1, but in other examples other numbers of fluid samplers may be used.

Fluid communication between the fluid samplers 28, 30 and a well fluid source (such as, the annulus 22 or the flow passage 16) is controlled in this example by means of a control module 34 connected to the fluid samplers. As depicted in FIG. 1, the control module 34 is separately mounted externally on the carrier 32 of the fluid sampler tool 12. Some or all internal components of the control module 34 may be externally accessible (such as, without a need to remove the control module from the carrier 32). In other examples, the control module 34 may not be externally mounted or have externally accessible components therein.

In the FIG. 1 example, the control module 34 contains sampler valves 36, 38 for the respective fluid samplers 28, 30. The sampler valve 36 selectively permits and prevents fluid communication between the fluid sampler 28 and the well fluid source (such as, the annulus 22 or flow passage 16). The sampler valve 38 selectively permits and prevents fluid communication between the fluid sampler 30 and the well fluid source.

A controller 40 controls operation of the sampler valves 36, 38. As described more fully below, the controller 40 can control operation of a sampler valve by supplying appropriate electrical power (such as, a voltage, current and polarity that will cause a desired operation) to an actuator for the sampler valve. In some examples, the controller 40 could be in the form of a programmable logic controller (PLC) or another form of electronic circuitry and software capable of controlling the operation of a valve actuator.

Sensors 42, 44 are used to sense certain well parameters in the downhole environment. For example, the sensors 42, 44 could include pressure, temperature, resistivity, density and/or acceleration sensors. Any number or combination of sensors may be used. The sensors 42, 44 may sense the well parameters internal and/or external to the fluid sampler tool 12.

As described more fully below, the controller 40 may be provided with a memory suitable for storing well parameter measurements obtained by the sensors 42, 44 over time. Thus, the fluid sampler tool 12 can include a "data-logging" capability that produces a record of the downhole well parameter measurements accessible from the control module 34 when the fluid sampler tool 12 is eventually retrieved from the well to a surface location.

In addition, the memory can store one or more sets of well parameter levels, values or ranges at which it is desired to operate the sampler valves 36, 38. For example, it may be desired to open the sampler valve 36 when a downhole pressure and/or temperature as sensed by the sensors 42, 44 reach certain levels. The fluid sample 24 is received in the fluid sampler 28 when the sampler valve 36 is opened. Thereafter, it may be desired to close the sampler valve 36 when the downhole pressure and temperature as sensed by the sensors 42, 44 are below certain levels.

The sampler valve 38 may be operated in response to the same set of well parameter levels or ranges as the sampler valve 36, or different well parameter levels or ranges may be used for operation of the sampler valve 38. For example, the sampler valve 38 could be opened at a pressure or temperature level that is greater or less than a pressure or temperature level at which the valve 36 is operated.

For convenience, the fluid sampler tool 12 is described below as it may be used in the system 10 to obtain the fluid samples 24, 26 from the annulus 22 in the FIG. 1 example. However, it should be clearly understood that the scope of this disclosure is not limited to any particular details of the FIG. 1 example.

Figure 2:
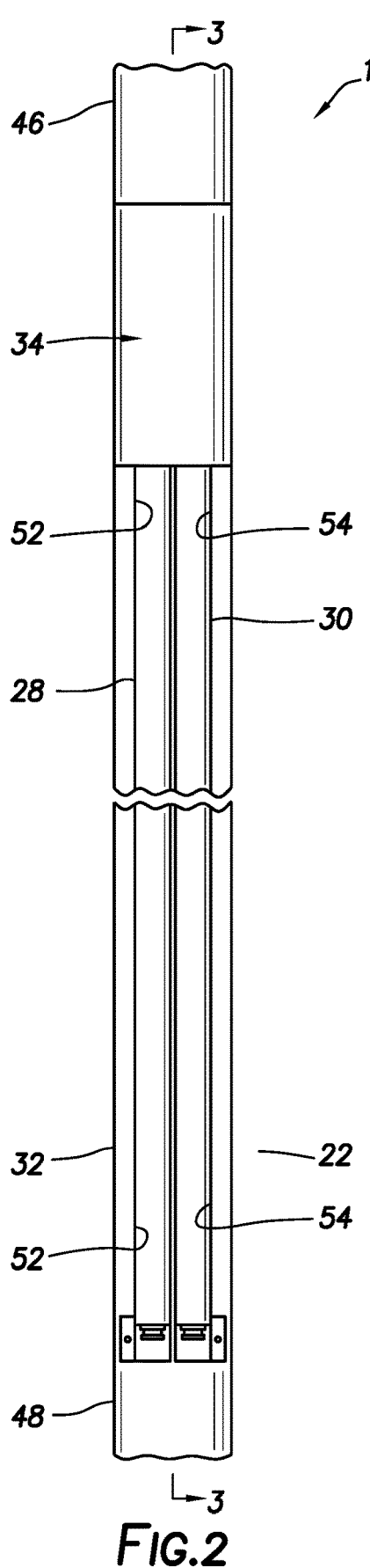
FIG. 2 is a representative side view of an example of a fluid sampler tool that may be used with the system and method of FIG. 1.
Figure 3:
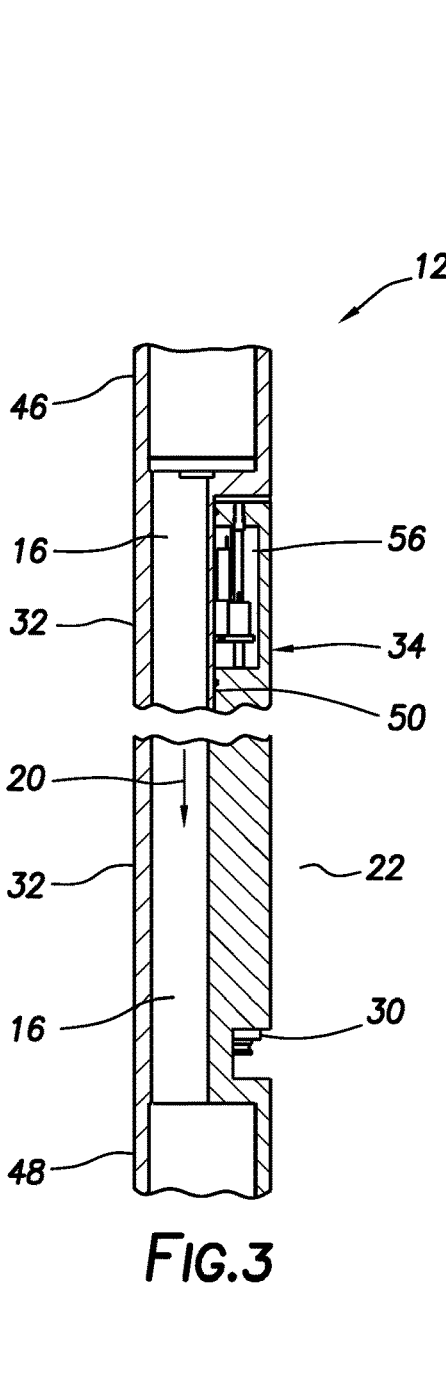
FIG. 3 is a representative cross-sectional view of the fluid sampler tool, taken along line 3-3 of FIG. 2.

Referring additionally now to FIGS. 2 & 3, side and cross-sectional views of one example of the fluid sampler tool 12 are representatively illustrated. In this example, the control module 34 and the fluid samplers 28, 30 are externally mounted on the carrier 32. This configuration provides for convenient access to the fluid samplers 28, 30 and the control module 34.

The carrier 32 is generally tubular, with the flow passage 16 extending longitudinally through the carrier. Upper and lower connectors 46, 48 are provided at opposite ends of the carrier 32 for connecting the carrier as a part of a tubular string (such as, the FIG. 1 tubular string 14). The upper and lower connectors 46, 48 can include threads, seals or other features for connecting and sealing the carrier 32 in the tubular string.

The control module 34 is attached to a flat surface 50 formed on the exterior of the carrier 32. The fluid samplers 28, 30 are received in respective longitudinally extending slots or recesses formed on the carrier 32. Upper ends of the fluid samplers 28, 30 are in fluid communication with components (such as, the sampler valves 36, 38) enclosed in a chamber 56 of the control module 34.

Figure 4:
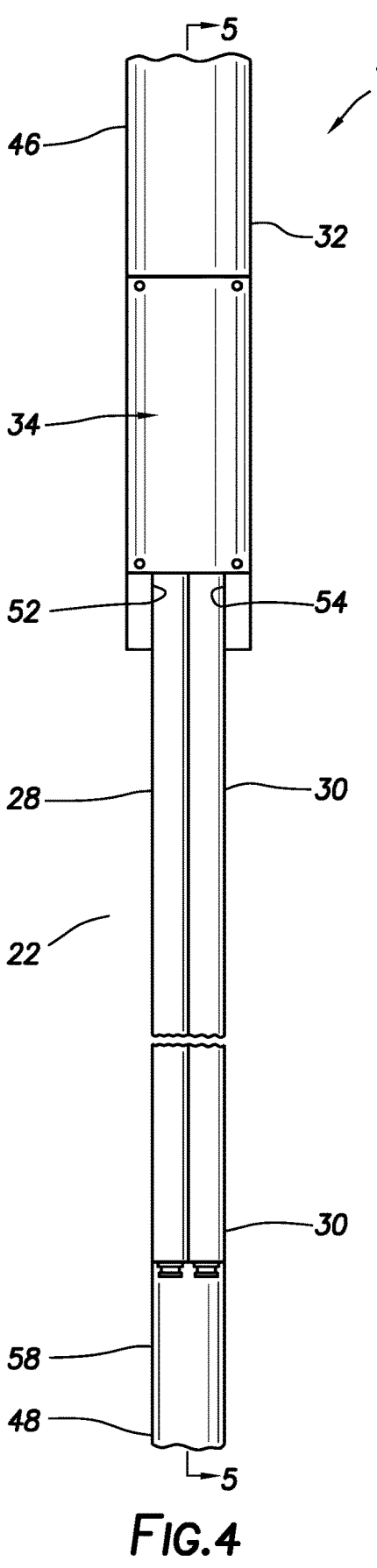
FIG. 4 is a representative side view of another example of the fluid sampler tool.
Figure 5:
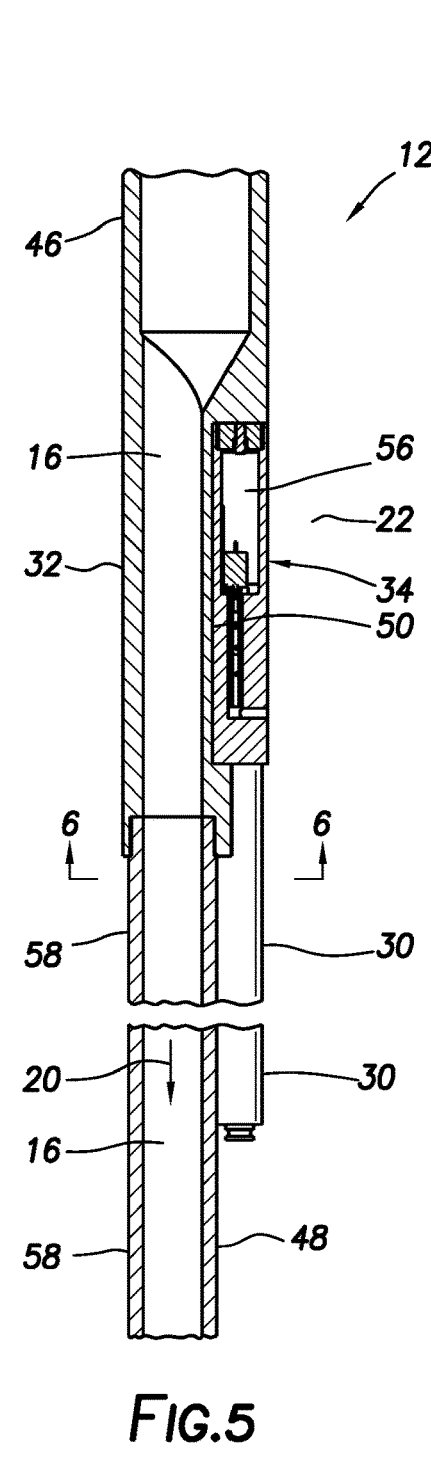
FIG. 5 is a representative cross-sectional view of the fluid sampler tool, taken along line 5-5 of FIG. 4.
Figure 6:
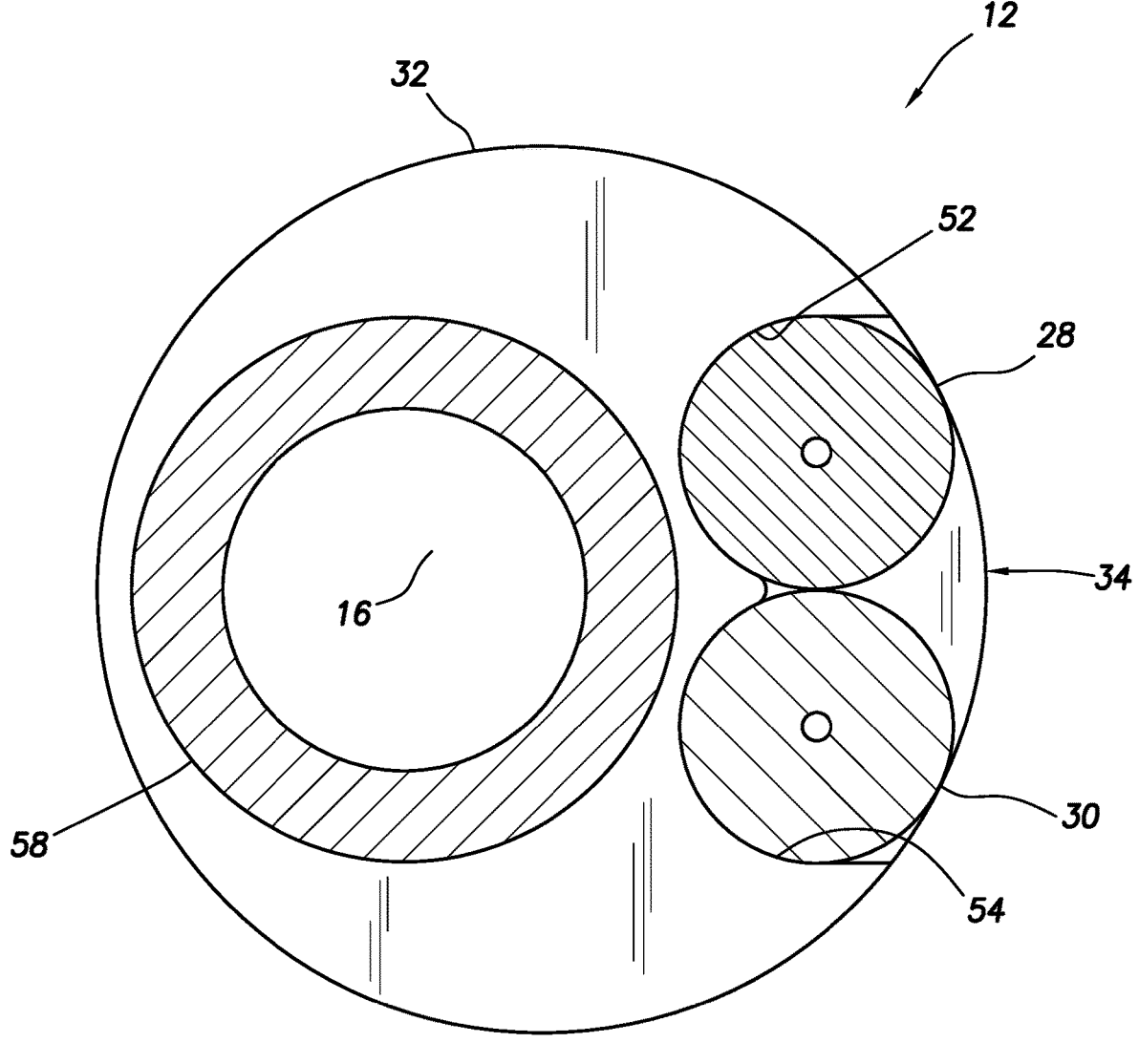
FIG. 6 is a representative cross-sectional view of the fluid sampler tool, taken along line 6-6 of FIG. 5.

Referring additionally now to FIGS. 4-6, side and cross-sectional views of another example of the fluid sampler tool 12 are representatively illustrated. The FIGS. 4-6 example is similar in many respects to the FIGS. 2 & 3 example, and so the same reference numbers are used in FIGS. 4-6 to indicate similar elements.

The carrier 32 in the FIGS. 4-6 example does not extend the full length of the fluid sampler tool 12. Instead, a pipe or other tubular 58 is connected at a lower end of the carrier 32, so that the flow passage 16 extends through the tubular 58. In the FIGS. 2-6 examples, straps, clamps or other devices may be used to retain the fluid samplers 28, 30 on the exterior of the carrier 32 or tubular 58, and in the recesses 52, 54.

Figures 7, 8:
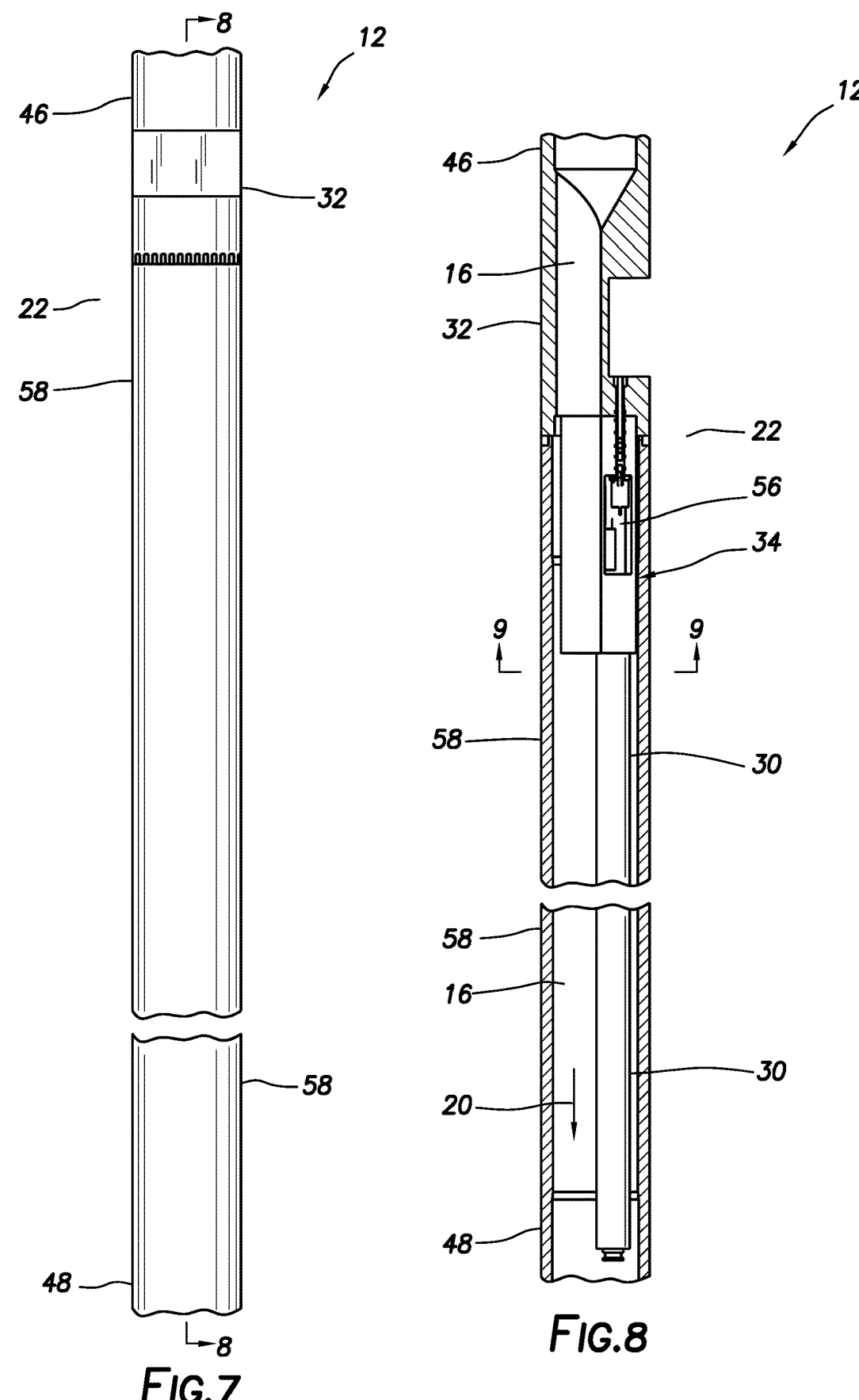
FIG. 7 is a representative side view of another example of the fluid sampler tool.
FIG. 8 is a representative cross-sectional view of the fluid sampler tool, taken along line 8-8 of FIG. 7.
Figure 9:
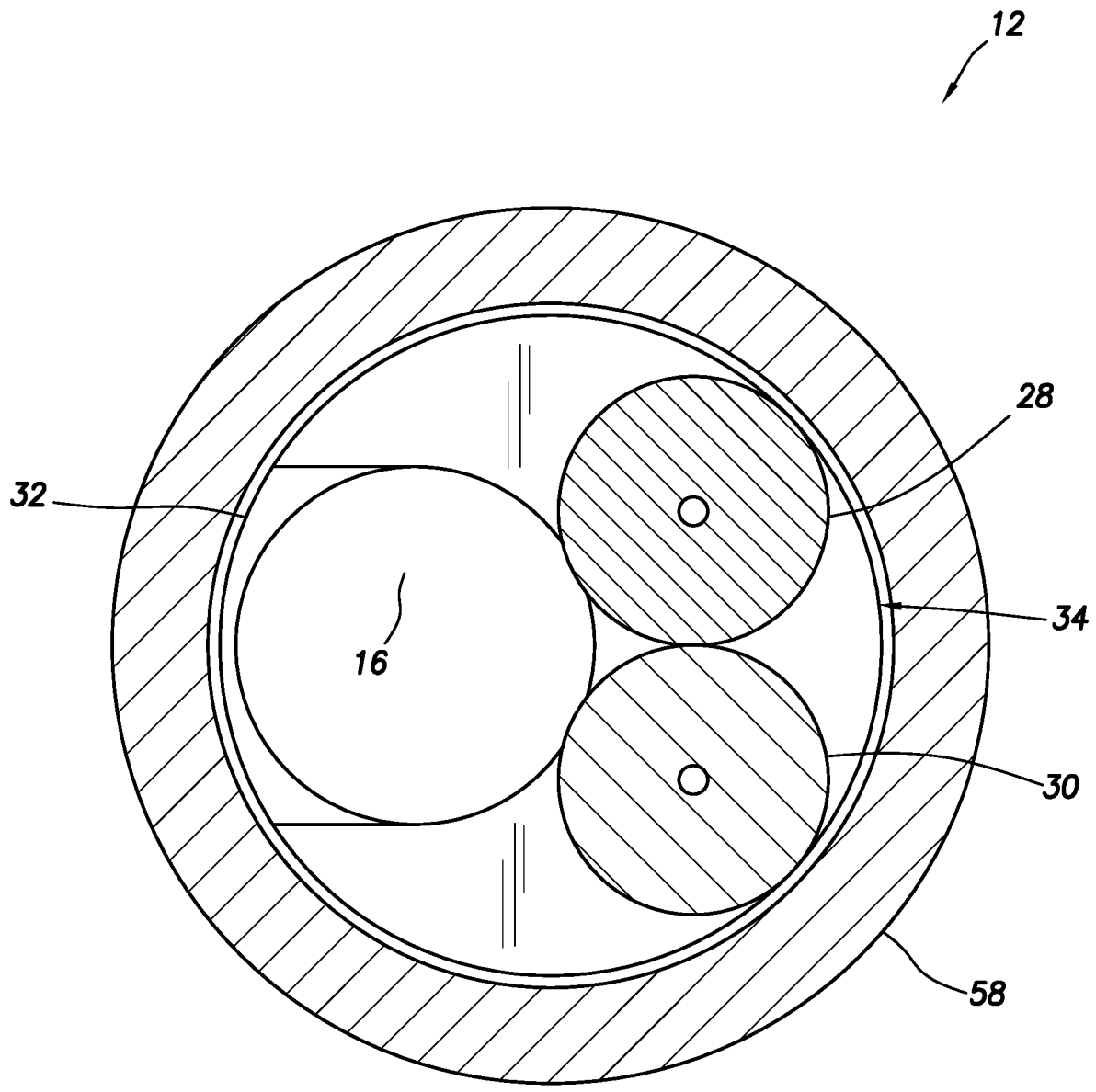
FIG. 9 is a representative cross-sectional view of the fluid sampler tool, taken along line 9-9 of FIG. 8.

Referring additionally now to FIGS. 7-9, side and cross-sectional views of another example of the fluid sampler tool 12 are representatively illustrated. The FIGS. 7-9 example differs substantially from the FIGS. 4-6 example in that the fluid samplers 28, 30 and the control module 34 are positioned within the tubular 58, which is enlarged to thereby accommodate the fluid samplers, the control module and the flow passage 16 therein.

Figure 10:
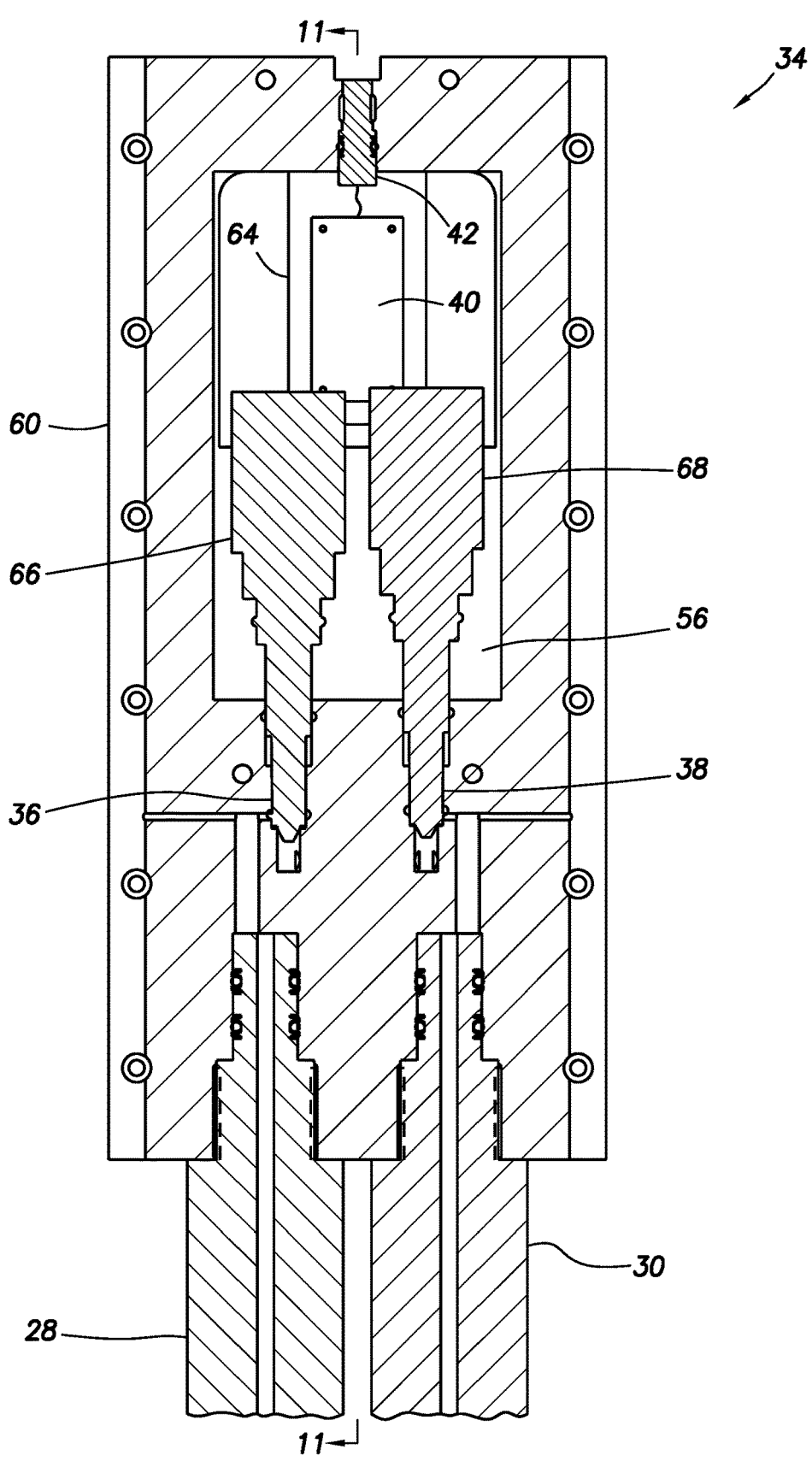
FIG. 10 is a representative cross-sectional view of an example of a control module of the fluid sampler tool, taken along line 10-10 of FIG. 11.
Figure 11:
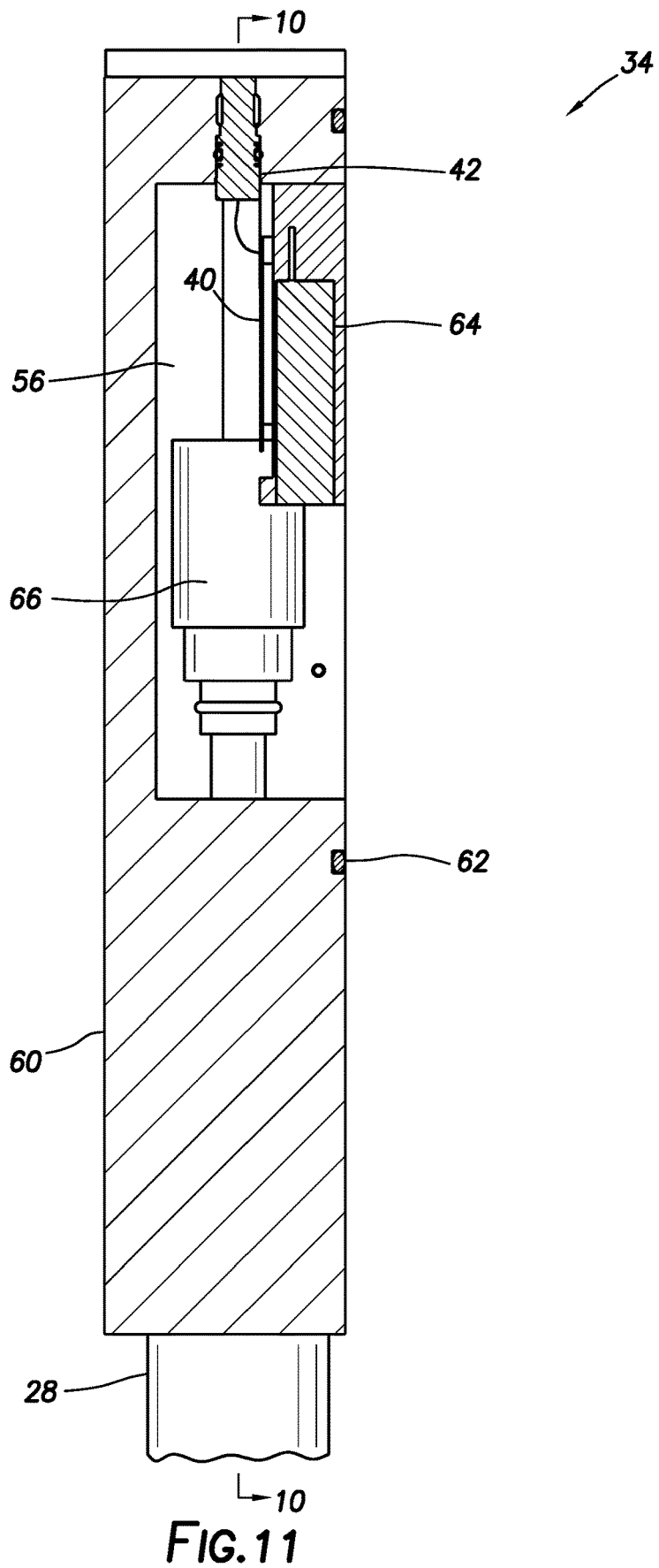
FIG. 11 is a representative cross-sectional view of the control module, taken along line 11-11 of FIG. 10.

Referring additionally now to FIGS. 10 & 11, cross-sectional views of an example of the control module 34 are representatively illustrated. In the FIGS. 10 & 11 example, the control module 34 includes a housing 60 in which the chamber 56 is formed. The chamber 56 is open on one side, with a seal 62 provided to seal against the flat surface 50 (see FIGS. 3 & 5) formed on the carrier 32.

The chamber 56 is preferably completely isolated from the well environment external to the control module 34. For example, the chamber 56 could be an atmospheric chamber (e.g., containing air at substantially atmospheric pressure when the fluid sampler tool 12 is deployed into a well), or the chamber could be filled with a liquid or gel (such as, a dielectric fluid or silicone). The chamber 56 could be pressure balanced with the well environment external to the control module 34, in which case the chamber would preferably be isolated from contact with well fluids, even if the chamber is at a well pressure.

A sensor 42 is installed in a wall of the housing 60, so that the sensor is exposed to the well environment external to the housing. For example, the sensor 42 may be a pressure sensor for sensing pressure in the external well environment. If the sensor 42 is another type of sensor (such as, a temperature sensor or an accelerometer), the sensor may not be exposed to the external well environment.

The controller 40 and one or more batteries 64 are also enclosed in the chamber 56. The sampler valves 36, 38 are in the form of pilot or poppet valves that permit or prevent fluid communication between the external well environment (such as the FIG. 1 annulus 22) and the respective fluid samplers 28, 30. Suitable flow paths are formed in the housing 60 to supply fluid from the well fluid source to the valves 36, 38, and from the valves to the respective fluid samplers 28, 30.

To actuate the valves 28, 30 between their open and closed configurations, electromechanical actuators 66, 68 are used to actuate the respective valves 36, 38. In this example, the electromechanical actuators 66, 68 are electrical solenoids that respond to electrical power supplied by or from the controller 40 to actuate the valves 36, 38.

Note that it is not necessary for the electrical power to be supplied from the batteries 64. Other suitable electrical power sources may be used in keeping with the scope of this disclosure. For example, a downhole generator may be used, or an electrical cable extending to a surface electrical power source may be used, instead of the batteries 64.

Figure 12:
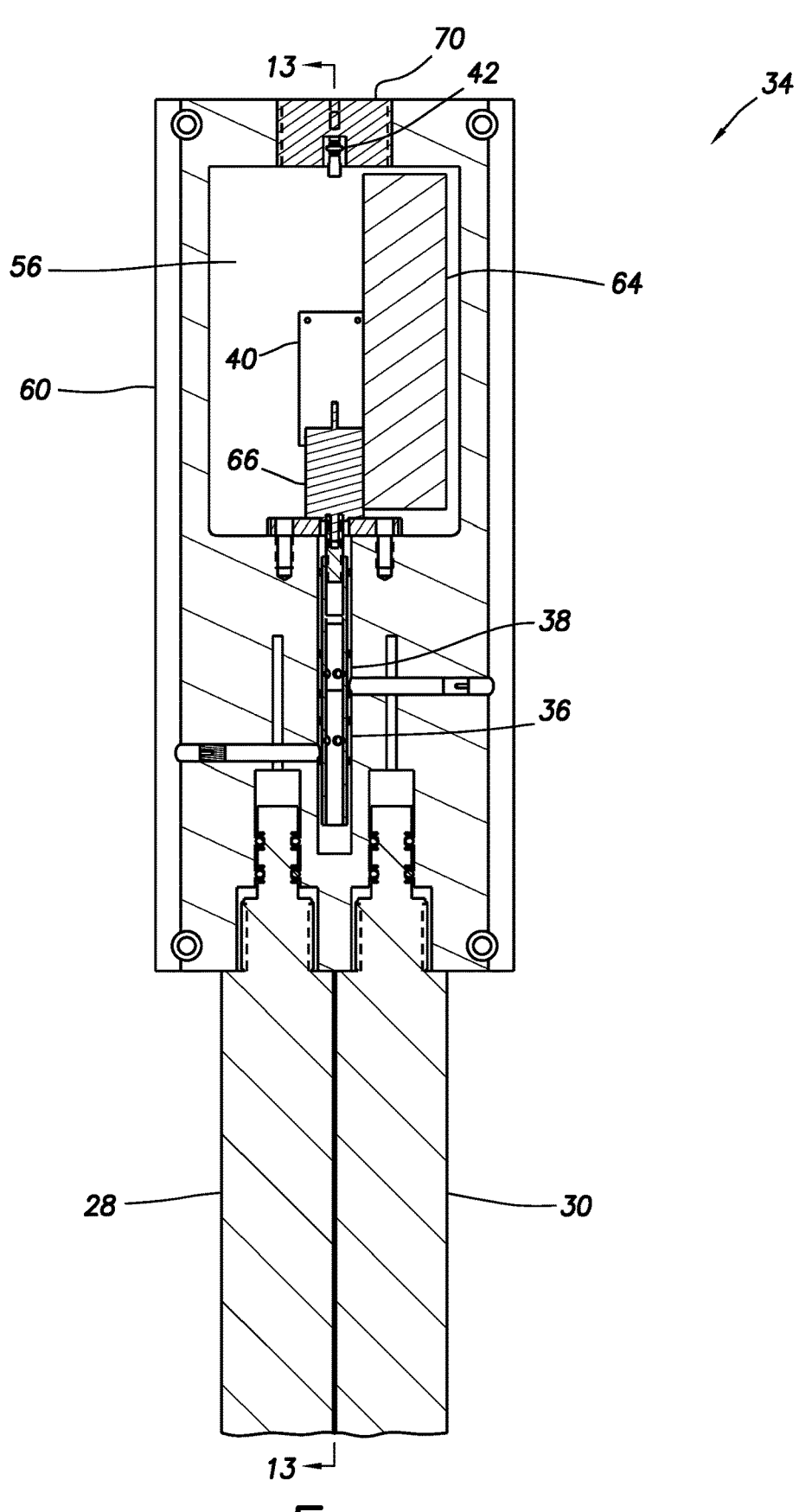
FIG. 12 is a representative cross-sectional view of another example of the control module, taken along line 12-12 of FIG. 13.
Figure 13:
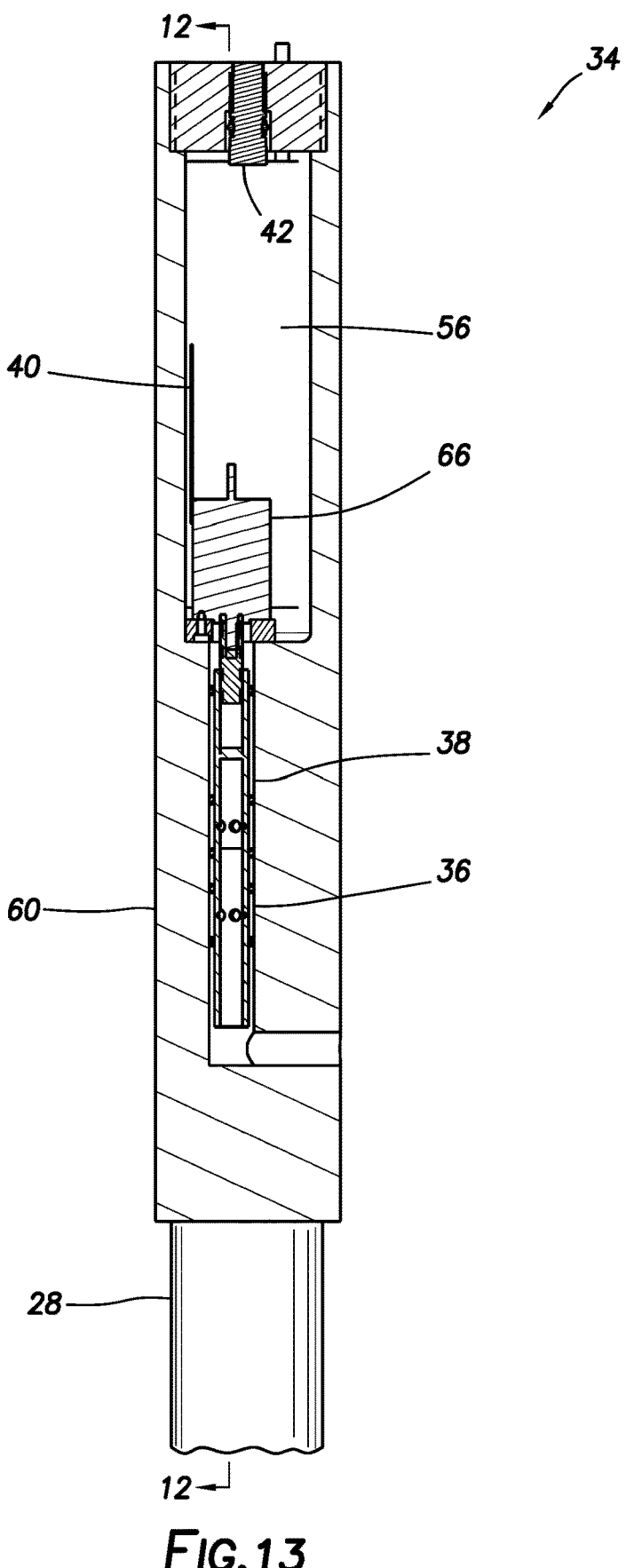
FIG. 13 is a representative cross-sectional view of the control module, taken along line 13-13 of FIG. 12.

Referring additionally now to FIGS. 12 & 13, cross-sectional views of another example of the control module 34 are representatively illustrated. In this example, the electromechanical actuator 66 is an electrical motor that responds to electrical power supplied by or from the controller 40 to actuate the valves 36, 38.

The single actuator 66 is used to actuate both of the valves 36, 38 in the FIGS. 12 & 13 example. The valves 36, 38 are in the form of a ported sleeve that is sealingly received in a bore and cooperates with the flow paths formed in the housing 60 to selectively permit and prevent fluid communication between the respective fluid samplers 28, 30 and the well fluid source.

The actuator 66 displaces the ported sleeve longitudinally in the bore (such as, via a threaded connection between the motor and the ported sleeve). In other examples, a separate actuator with a corresponding separate ported sleeve and seal bore may be used for each respective fluid sampler 28, 30. In these examples, each of the valves 36, 38 would comprise a set of a ported sleeve and a seal bore.

As depicted in FIGS. 12 & 13, the sensor 42 is received in a plug 70 installed in an end of the control module 34. Preferably, the plug 70 is sized so that components in the chamber 56 are accessible by removing the plug from the housing 60. In this manner, the components (such as, the batteries 64, the actuator 66, various seals, etc.) can be removed from the chamber 56 for maintenance or repair, or the components (such as, the controller 40 and/or associated memory) can be accessed for download of stored sensor measurements, etc. The plug 70 may be used with any of the control module 34 examples described herein.

Figure 14:
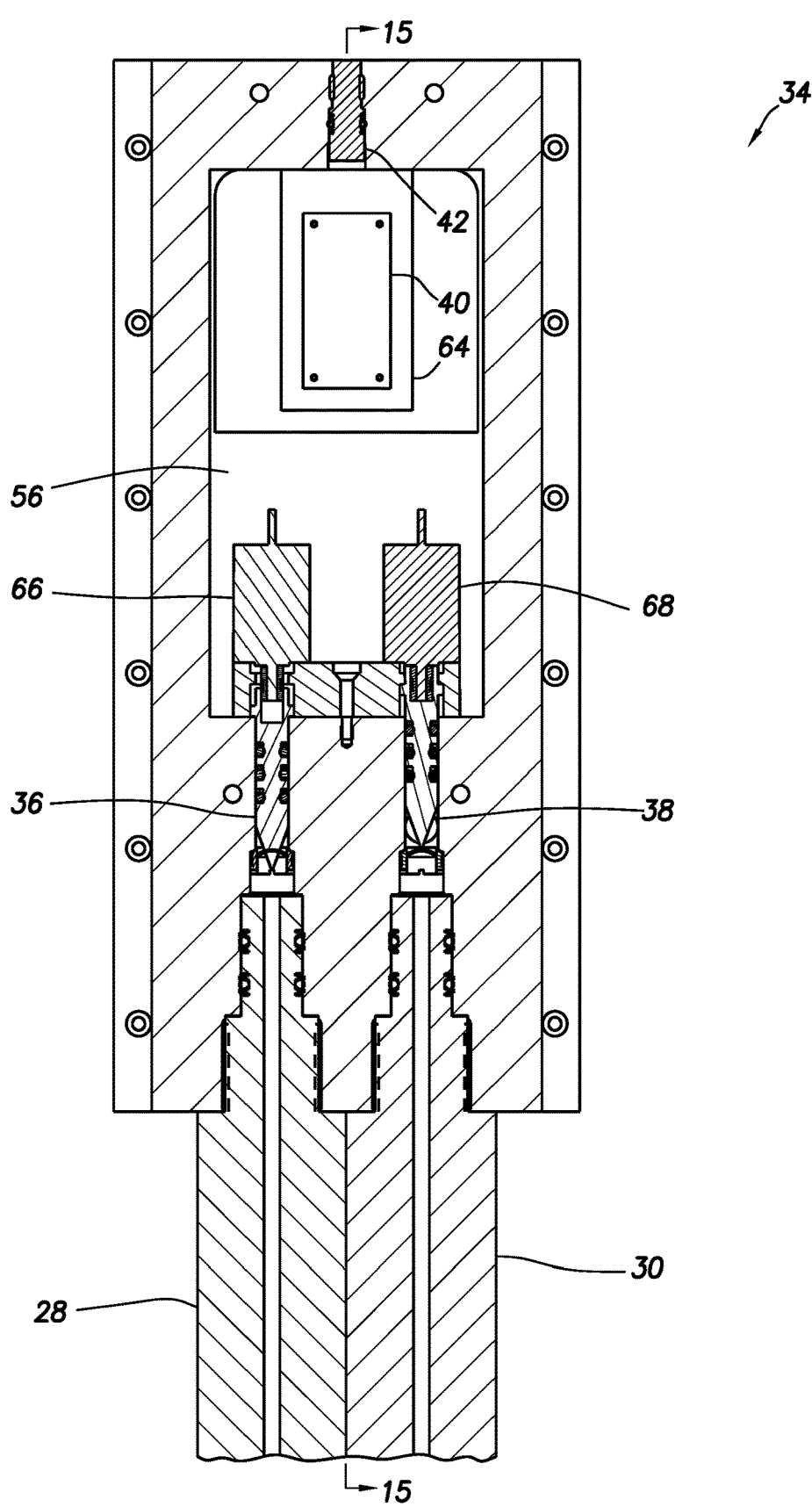
FIG. 14 is a representative cross-sectional view of another example of the control module, taken along line 14-14 of FIG. 15.
Figure 15:
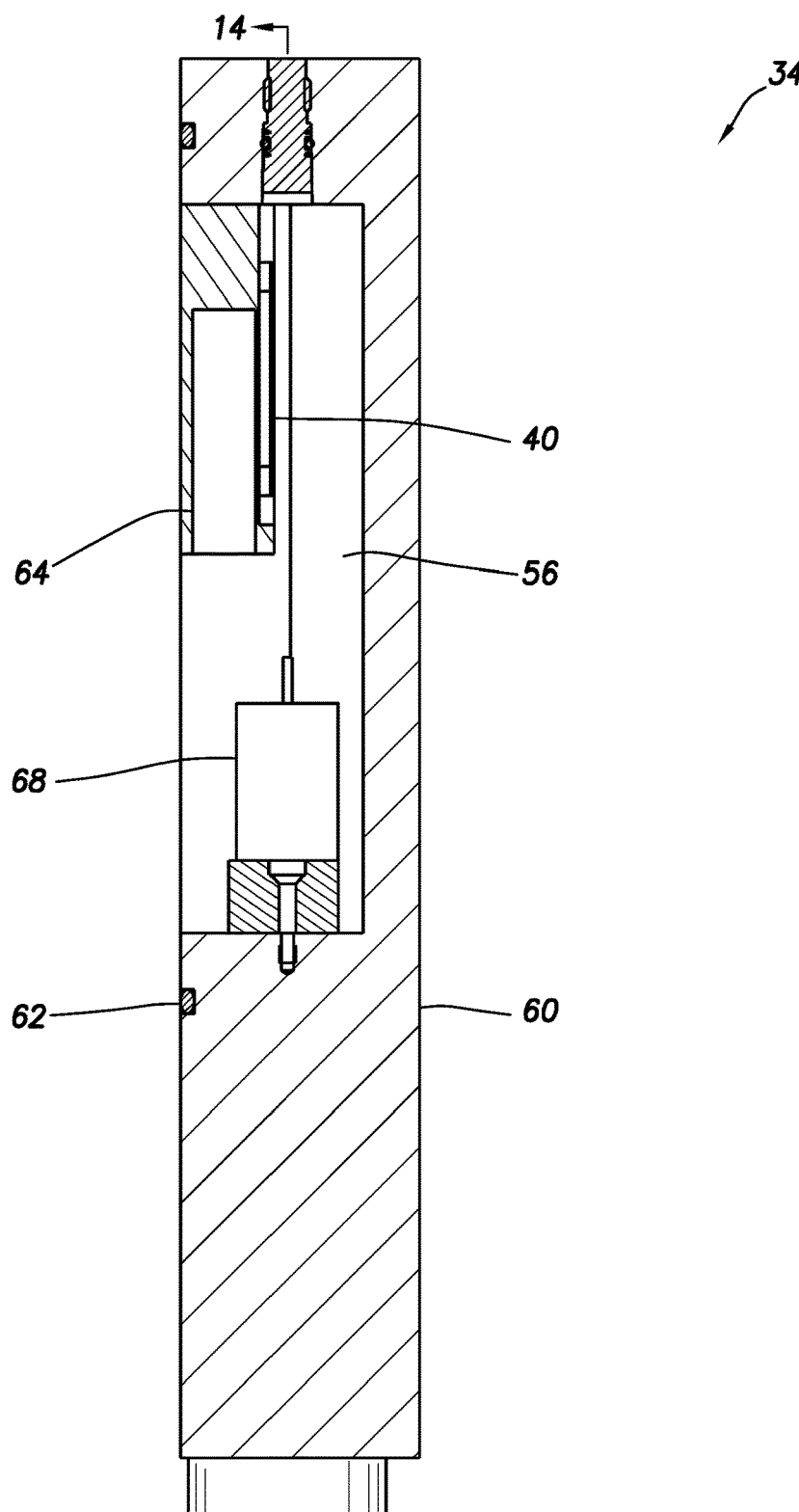
FIG. 15 is a representative cross-sectional view of the control module, taken along line 15-15 of FIG. 14.

Referring additionally now to FIGS. 14 & 15, cross-sectional views of another example of the control module 34 are representatively illustrated. In this example, separate electromechanical actuators 66, 68 in the form of electrical motors are used to actuate the respective valves 36, 38.

The valves 36, 38 are in the form of needles or poppets that are longitudinally displaceable by the respective actuators 66, 68. The valve 36 is depicted in a closed configuration, and the valve 38 is depicted in an open configuration in FIG. 14.

Figure 16:
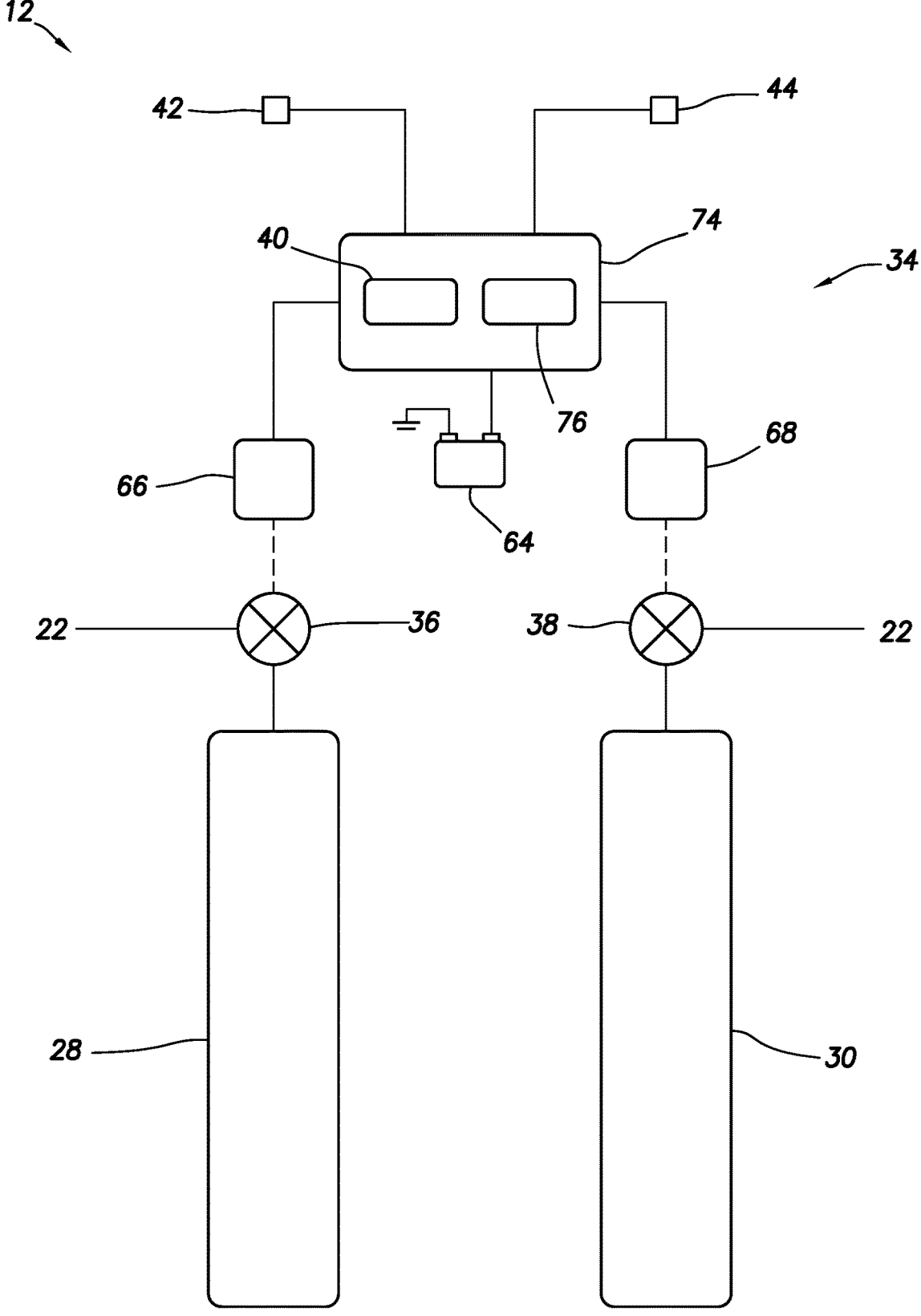
FIG. 16 is a representative schematic view of an example of the fluid sampler tool.

Referring additionally now to FIG. 16, a schematic diagram of the fluid sampler tool 12 is representatively illustrated. In this diagram, the manner in which the sampler valves 36, 38 are independently actuated by the respective actuators 66, 68 under the control of the controller 40 can be readily seen. In the FIG. 16 example, the controller 40 is included as part of a control system 74. The control system 74 may be partially or completely contained in the control module 34.

The FIG. 16 control system 74 includes a memory 76 capable of storing sensor data (such as, sensed well parameters over time) output by the sensors 42, 44. In addition, the memory 76 may store instructions for operation of the controller 40 (such as, selected well parameter ranges or levels at which it is desired for the respective valves 36, 38 to be opened or closed).

The well parameter ranges or levels are preferably selected as appropriate for a particular well operation in a particular well. For example, it may be desired for the valve 36 to open when sensed well pressure is greater than one level in one well, and for the valve 36 to close when sensed well pressure is less than another level in that well. However, in another well, it may be desired for the valve 36 to open when sensed well pressure is greater than a third level, and for the valve 36 to close when sensed well pressure is less than a fourth level.

The controller 40 and/or memory 76 may be accessed using a variety of different techniques, for example, in order to download stored sensed well parameters, to upload the selected well parameter levels or ranges to the memory, or to program the controller. Wired or wireless communication (such as, USB or another serial bus, Bluetooth™, WiFi, etc.) may be used for communicating with the control system 74.

Although in the examples depicted in FIGS. 2-15 the control module 34 is separate from, but in fluid communication with the fluid samplers 28, 30, in other examples the control module could be integral with the fluid samplers. In these other examples, the battery 64 could be internal or external to the fluid samplers 28, 30. Thus, the scope of this disclosure is not limited to any particular structural configuration of the fluid samplers 28, 30, the control module 34 or the battery 64.

Figure 17:
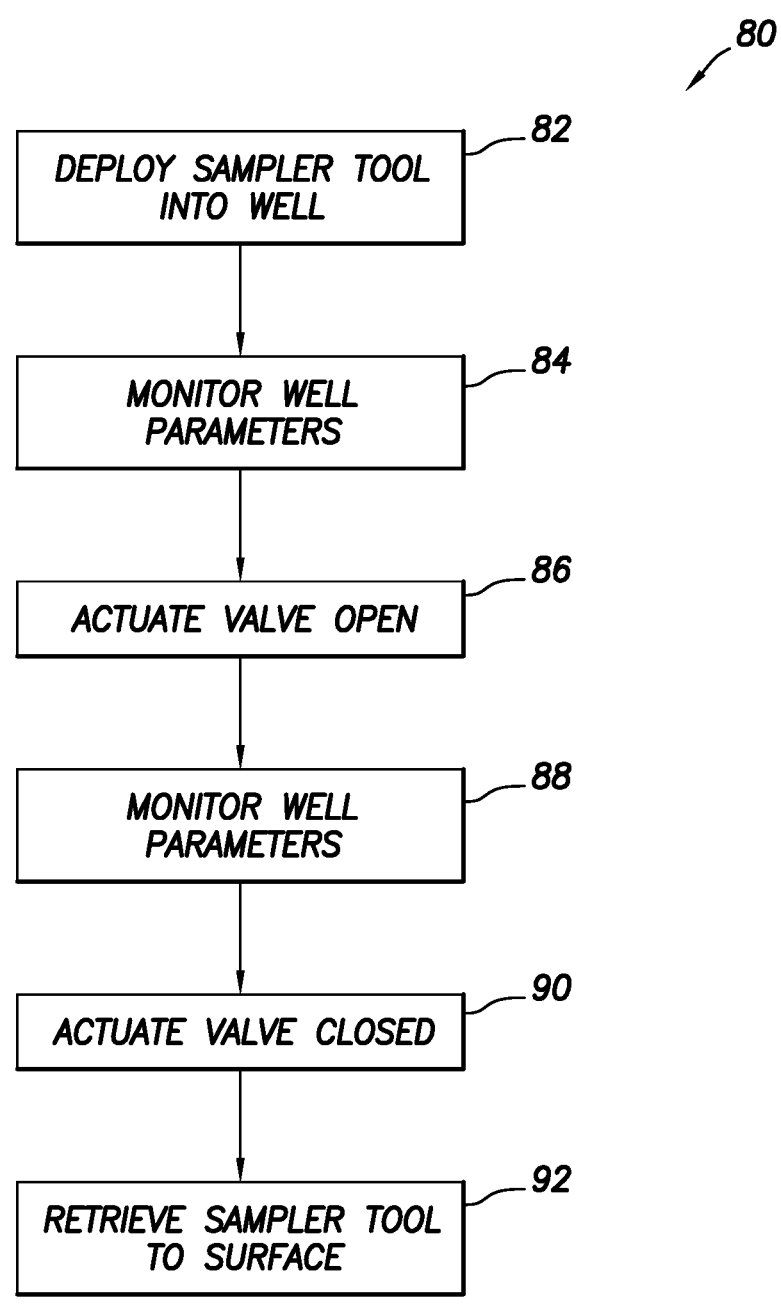
FIG. 17 is a representative flowchart for an example method of obtaining a well fluid sample.

Referring additionally now to FIG. 17, a flowchart for an example of a method 80 of obtaining a fluid sample 24 in a well is representatively illustrated. In this example, only a single fluid sample is obtained, but in other examples (e.g., see FIG. 18), multiple fluid samples may be obtained.

An initial step 82 in the FIG. 17 method 80 comprises deploying the fluid sampler tool 12 into a well. In the FIG. 1 example, the fluid sampler tool 12 is connected as part of the tubular string 14, and is deployed along with the tubular string into the wellbore 18. The longitudinal flow passage 16 of the tubular string 14 also extends longitudinally through the fluid sampler tool 12, so that the fluid 20 can be flowed through the fluid sampler tool. Well operations (such as drilling, etc.) may be performed with the tubular string 14 after the fluid sampler tool 12 is deployed into the well.

In step 84, well parameters (such as, pressure, temperature, acceleration, etc.) are monitored. The sensors 42, 44 are used to monitor the well parameters, either continuously, at selected intervals, or in response to a signal transmitted from a remote location (such as, via telemetry from a surface location).

In one example, the monitoring may begin in response to a signal transmitted from a radio frequency identification (RFID) tag deployed into the flow passage 16. In this example, the fluid sampler tool 12 can include an RFID receiver (for example, one of the sensors 42, 44 could be an RFID receiver).

In step 86, the sampler valve 36 is opened by the controller 40 when the sensed well parameter is in a predetermined range (or a combination of well parameters are within respective predetermined ranges).

For example, the sampler valve 36 may be opened by the controller 40 supplying appropriate electrical power to the actuator 66 when the sensed well pressure is greater than a selected pressure level and/or when the sensed well temperature is greater than a selected temperature level. The selected pressure and/or temperature levels/ranges may be stored in the memory 76 prior to the fluid sampler tool 12 being deployed into the well.

As another example, the sampler valve 36 may be opened by the controller 40 supplying appropriate electrical power to the actuator 66 when an integration of the sensed acceleration over time indicates that the fluid sampler tool 12 is positioned at a selected desired depth range for obtaining a fluid sample 24. The desired depth range may be stored in the memory 76 prior to the fluid sampler tool 12 being deployed into the well.

In step 88, the sensed well parameters are monitored, in order to determine when the sampler valve 36 is to be closed. This monitoring step 88 is similar to the monitoring step 84 discussed above. Instead of separate monitoring steps 84, 88, the monitoring could be performed continuously as a single step, or intermittently (such as, in accordance with instructions programmed in the controller 40 or memory 76, or in response to communication with a remote location, e.g., via telemetry or RFID tag deployment).

In step 90, the sampler valve 36 is closed by the controller 40 when the sensed well parameter (or combination of well parameters) is in a predetermined range. This predetermined range would in some examples be less than the step 86 predetermined range, so that the sampler valve 36 is closed when the fluid sampler tool 12 is retrieved (after the sampler valve was previously opened), but this is not necessary in keeping with the scope of this disclosure.

For example, the sampler valve 36 may be closed by the controller 40 supplying appropriate electrical power to the actuator 66 when the sensed well pressure is less than a selected pressure level and/or when the sensed well temperature is less than a selected temperature level.

As another example, the sampler valve 36 may be closed by the controller 40 supplying appropriate electrical power to the actuator 66 when an integration of the sensed acceleration over time indicates that the fluid sampler tool 12 is positioned at a selected depth range for retaining the fluid sample 24 in the fluid sampler 28.

In step 92, the fluid sampler tool 12 is retrieved to the surface. At a surface location, the fluid sample 24 can be safely withdrawn from the fluid sampler 28. In some examples described above (see FIGS. 2-6), the fluid samplers 28, 30 and control module 34 can be conveniently removed from the carrier 32 for ready access to the fluid samples 24, 26 and the internal components of the control module 34. Alternatively, the fluid samples 24, 26 or the internal components of the control module 34 may be accessed (such as, via the plug 70, see FIGS. 12 & 13) while the fluid samplers 28, 30 and/or control module remain mounted on or to the carrier 32.

Figure 18:
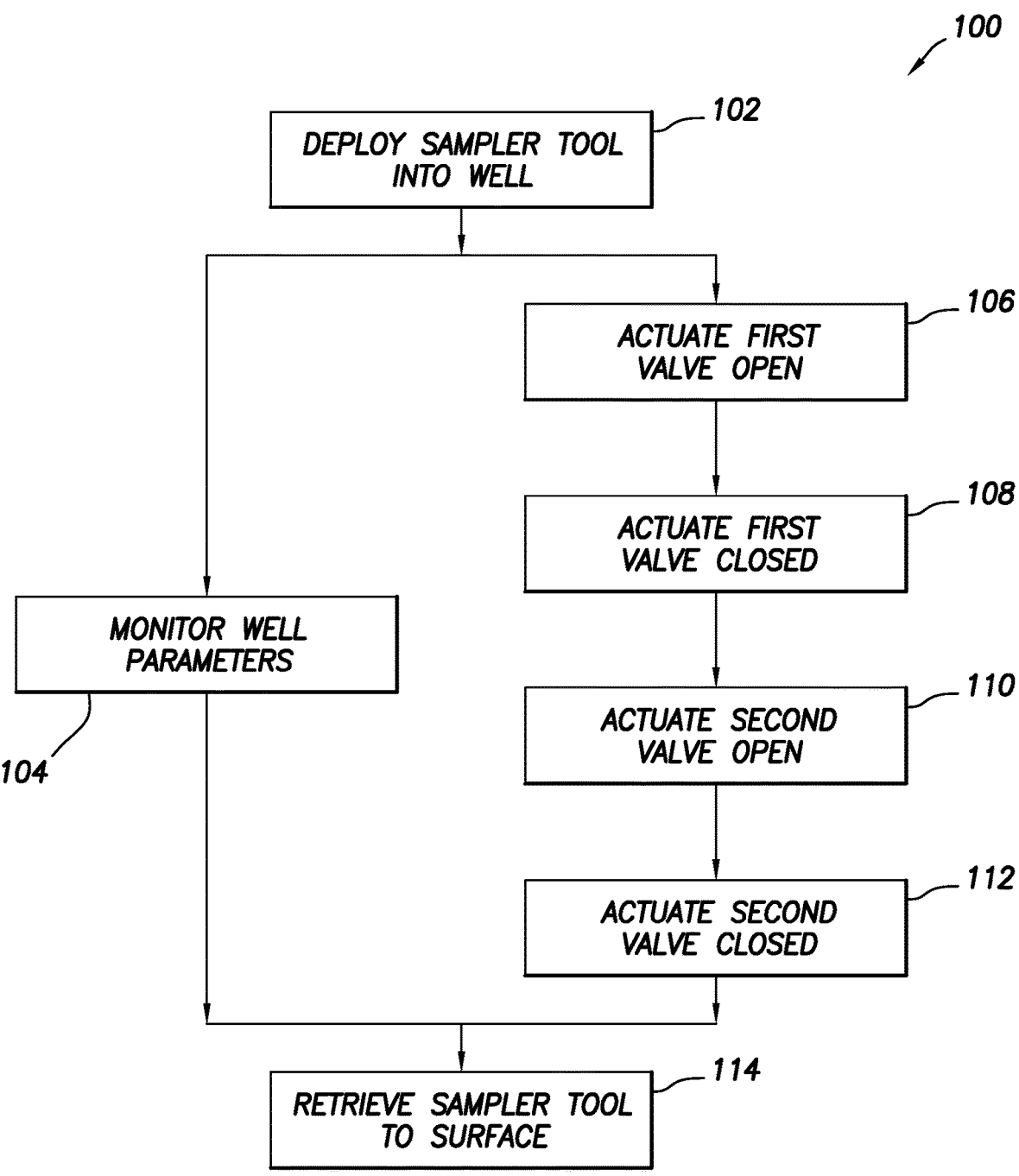
FIG. 18 is a representative flowchart for an example method of obtaining multiple well fluid samples.

Referring additionally now to FIG. 18, a flowchart for another example of a method 100 for obtaining multiple fluid samples 24, 26 in a well is representatively illustrated. An initial step 102 in the FIG. 18 method 100 comprises deploying the fluid sampler tool 12 into a well. This step 102 is similar to the step 82 of the FIG. 17 method 80.

In step 104, well parameters (such as, pressure, temperature, acceleration, etc.) are monitored. This step is similar to the step 84 of the FIG. 17 method 80. However, in FIG. 18, the monitoring step 104 is depicted as being performed in parallel with other steps 106, 108, 110, 112 of the method 100. The monitoring step 104 may be performed continuously, periodically, intermittently, automatically, or in response to instructions, commands, signals or telemetry from the surface, between the deploying step 102 and the retrieving step 114.

In step 106, the sampler valve 36 is opened by the controller 40 when the sensed well parameter is in a first predetermined range (or a combination of well parameters are within respective predetermined ranges). This step 106 is similar to the step 86 of the FIG. 17 method 80. As a result of this step 106, the fluid sample 24 is received in the fluid sampler 28.

In step 108, the sampler valve 36 is closed by the controller 40 when the sensed well parameter (or combination of well parameters) is in a second predetermined range. The second predetermined range is preferably (but not necessarily) different from the first predetermined range. This step is similar to the step 90 of the FIG. 17 method 80. As a result of this step 108, the fluid sample 24 is retained in the fluid sampler 28 and is isolated from the well fluid source (e.g., the annulus 22 or flow passage 16).

In step 110, the sampler valve 38 is opened by the controller 40 when the sensed well parameter is in a third predetermined range (or a combination of well parameters are within respective predetermined ranges). The third predetermined range is preferably (but not necessarily) different from each of the first and second predetermined ranges. This step 110 is similar to the step 106, but is performed for the sampler 30, instead of the sampler 28. As a result of this step 110, the fluid sample 26 is received in the fluid sampler 30.

In step 112, the sampler valve 38 is closed by the controller 40 when the sensed well parameter (or combination of well parameters) is in a fourth predetermined range. The fourth predetermined range is preferably (but not necessarily) different from each of the first, second and third predetermined ranges. This step is similar to the step 108, but is performed for the sampler 30, instead of the sampler 28. As a result of this step 112, the fluid sample 26 is retained in the fluid sampler 30 and is isolated from the well fluid source (e.g., the annulus 22 or flow passage 16).

In step 114, the fluid sampler tool 12 is retrieved to the surface. At a surface location, the fluid samples 24, 26 can be safely withdrawn from the fluid samplers 28, 30. This step 114 is similar to the step 92 of the FIG. 17 method 80.

It may now be fully appreciated that the above disclosure provides significant advancements to the art of designing, constructing and utilizing fluid sampler tools. In some examples described above, the fluid sampler tool 12 can be used to obtain multiple different fluid samples 24, 26 at respective different well conditions, and without requiring any intervention from the surface. The controller 40 can operate the sampler valves 36, 38 in response to measured well parameters being within predetermined ranges, which can be stored in the memory 76 prior to the fluid sampler tool 12 being deployed into a well.

The above disclosure provides to the art a method 80, 100 of obtaining at least one fluid sample 24, 26 in a subterranean well. In one example, the method 80, 100 can include: deploying a fluid sampler tool 12 into the well, the fluid sampler tool 12 comprising at least one fluid sampler 28, 30, at least one sampler valve 36, 38 that selectively permits and prevents flow between the fluid sampler 28, 30 and a well fluid source (such as, the annulus 22 or flow passage 16), a controller 40 that controls operation of the sampler valve 36, 38, and at least one sensor 42, 44 that senses a well parameter; and the controller 40 operating the sampler valve 36, 38 in response to the sensed well parameter being within a first predetermined well parameter range.

In any of the examples described herein:

The controller 40 operating the sampler valve 36, 38 step may include the controller 40 opening the sampler valve 36, 38 in response to the sensed well parameter being within the first predetermined well parameter range. The method 80, 100 may also include the controller 40 closing the sampler valve 36, 38 in response to the sensed well parameter being within a second predetermined well parameter range.

The "at least one" sampler valve may include at least first and second sampler valves 36, 38. The controller 40 operating the sampler valve 36, 38 step may include the controller 40 operating the first sampler valve 36 in response to the sensed well parameter being within the first predetermined well parameter range. The method 100 may include the controller 40 operating the second sampler valve 38 in response to the sensed well parameter being within a second predetermined well parameter range.

The deploying step may include connecting the fluid sampler tool 12 in a tubular string 14, so that a flow passage 16 of the tubular string 14 extends longitudinally through the fluid sampler tool 12. The tubular string 14 may comprise a drill string. The method 80, 100 may include, after the deploying step, drilling a wellbore 18 in response to fluid 20 flow through the flow passage 16.

The controller 40 operating the sampler valve 36, 38 step may be performed without communication with any surface location. The sampler valves 36, 38 may be operated in some examples without use of any instructions, commands, signals or telemetry from the surface.

The method 80, 100 may include installing the fluid sampler 28, 30 external to a carrier 32 of the fluid sampler tool 12. The installing step may include installing the fluid sampler 28, 30 in a longitudinally extending recess 52, 54 formed externally on the carrier 32.

The fluid sampler tool 12 may include an electromechanical actuator 66. The controller 40 operating the sampler valve 36, 38 step may include supplying electrical power to the electromechanical actuator 66 to actuate the sampler valve 36, 38. The electromechanical actuator 66 can include a solenoid and/or a motor.

The method may include enclosing the controller 40 in a chamber 56 on a carrier 32 of the fluid sampler tool 12, the chamber 56 being isolated from the well fluid source. The step of enclosing the controller 40 in the chamber 56 on the carrier 32 may include mounting the chamber 56 externally on the carrier 32.

The fluid sampler tool 12 may include an electromechanical actuator 66 that actuates the sampler valve 36, 38. The enclosing step may include enclosing the electromechanical actuator 66 in the chamber 56.

The sensor 42, 44 may be a pressure sensor, a temperature sensor and/or an accelerometer.

The fluid sampler tool 12 may include a memory 76. The method 80, 100 may include storing the sensed well parameter over time in the memory 76.

The above disclosure also provides to the art a fluid sampler tool 12 for use in a subterranean well. In one example, the fluid sampler tool 12 can include: at least one fluid sampler 28, 30 configured to receive a well fluid sample 24, 26; at least one sampler valve 36, 38 operable to selectively permit and prevent fluid communication with the fluid sampler 28, 30; a controller 40 configured to control operation of the sampler valve 36, 38; and a carrier 32 configured to connect the fluid sampler tool 12 in a tubular string 14. The controller 40 can be enclosed within a chamber 56 that is externally accessible on the carrier 32.

In any of the examples described herein:

The chamber 56 may be formed in a control module 34 mounted externally on the carrier 32.

The fluid sampler tool 12 may include at least one sensor 42, 44 that senses a well parameter. The controller 40 may be configured to control operation of the sampler valve 36, 38 in response to the well parameter being within a predetermined well parameter range.

The sensor 42, 44 may include a pressure sensor, a temperature sensor and/or an accelerometer. The fluid sampler tool 12 may include a memory 76 configured to store the well parameter as sensed by the sensor 42, 44 over time.

The "at least one" sampler valve may include at least first and second sampler valves 36, 38, the controller 40 may be configured to operate the first sampler valve 36 in response to the well parameter being within a first predetermined well parameter range, and the controller 40 may be configured to operate the second sampler valve 38 in response to the well parameter being within a second predetermined well parameter range.

A flow passage 16 may extend longitudinally through the carrier 32. The chamber 56 may be isolated from the flow passage 16 and an annulus 22 surrounding the fluid sampler tool 12.

The fluid sampler 28, 30 may be received in a longitudinally extending recess 52, 54 formed externally on the carrier 32.

The fluid sampler tool 12 may include an electromechanical actuator 66 configured to actuate the sampler valve 36, 38. The electromechanical actuator 66 may include a solenoid and/or a motor. The electromechanical actuator 66 may be enclosed in the chamber 56.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of obtaining at least one fluid sample in a subterranean well, the method comprising:

deploying a fluid sampler tool into the well, the fluid sampler tool comprising at least one fluid sampler, at least one sampler valve that selectively permits and prevents flow between the fluid sampler and a well fluid source, a controller that controls operation of the sampler valve, and at least one sensor that senses a well parameter, in which the controller is enclosed within a sealed control module which is mounted externally on a carrier of the fluid sampler tool, thereby facilitating access to the controller, and in which the carrier comprises upper and lower connectors at opposite ends of the carrier which permit the fluid sampler tool to be connected in a tubular string; and the controller operating the sampler valve in response to the sensed well parameter being within a first predetermined well parameter range, in which the controller opens the sampler valve in response to the sensed well parameter being within the first predetermined well parameter range, in which the controller closes the sampler valve in response to the sensed well parameter being within a second predetermined well parameter range, and in which the sampler valve is respectively opened and closed by displacing a closure member of the sampler valve.

2. The method of claim 1, in which the at least one sampler valve comprises at least first and second sampler valves, and the controller operating the sampler valve comprises the controller operating the first sampler valve in response to the sensed well parameter being within the first predetermined well parameter range; and further comprising the controller operating the second sampler valve in response to the sensed well parameter being within a third predetermined well parameter range.

3. The method of claim 1, in which the deploying comprises connecting the fluid sampler tool in the tubular string, so that a flow passage of the tubular string extends longitudinally through the fluid sampler tool.

4. The method of claim 3, in which the tubular string comprises a drill string; and further comprising, after the deploying, drilling a wellbore in response to fluid flow through the flow passage.

5. The method of claim 1, in which the controller operating the sampler valve is performed without communication with any surface location.

6. The method of claim 1, in which the fluid sampler is installed in a longitudinally extending recess formed externally on the carrier.

7. The method of claim 1, in which the fluid sampler tool further comprises an electromechanical actuator; and in which the controller operating the sampler valve comprises supplying electrical power to the electromechanical actuator to actuate the sampler valve.

8. The method of claim 7, in which the electromechanical actuator comprises at least one of a group consisting of a solenoid and a motor.

9. The method of claim 1, in which the controller is isolated from the well fluid source.

10. The method of claim 9, in which the fluid sampler tool further comprises a memory; and further comprising storing the sensed well parameter over time in the memory.

11. The method of claim 9, in which the fluid sampler tool further comprises an electromechanical actuator that actuates the sampler valve; and in which the electromechanical actuator is enclosed within the control module.

12. The method of claim 1, in which the sensor is selected from the group consisting of a pressure sensor, a temperature sensor and an accelerometer.

13. A fluid sampler tool for use in a subterranean well, the fluid sampler tool comprising:

at least one fluid sampler configured to receive a well fluid sample;

at least one sampler valve operable to selectively permit and prevent fluid communication with the fluid sampler;

a controller configured to control operation of the sampler valve; and a carrier comprising upper and lower connectors at opposite ends of the carrier which permit the fluid sampler tool to be connected in a tubular string, in which the controller is enclosed within a sealed control module which is mounted externally on the carrier, and in which the controller is accessible by removal of a plug from the control module while the carrier is connected in the tubular string.

14. The fluid sampler tool of claim 13, further comprising at least one sensor that senses a well parameter.

15. The fluid sampler tool of claim 14, in which the controller is configured to control operation of the sampler valve in response to the well parameter being within a predetermined well parameter range.

16. The fluid sampler tool of claim 14, in which the at least one sampler valve comprises at least first and second sampler valves, the controller is configured to operate the first sampler valve in response to the well parameter being within a first predetermined well parameter range, and the controller is configured to operate the second sampler valve in response to the well parameter being within a second predetermined well parameter range.

17. The fluid sampler tool of claim 14, in which the sensor is selected from the group consisting of a pressure sensor, a temperature sensor and an accelerometer.

18. The fluid sampler tool of claim 14, further comprising a memory configured to store the well parameter as sensed by the sensor over time.

19. The fluid sampler tool of claim 13, in which a flow passage extends longitudinally through the carrier, and the controller is isolated from the flow passage.

20. The fluid sampler tool of claim 13, in which the fluid sampler is received in a longitudinally extending recess formed externally on the carrier.

21. The fluid sampler tool of claim 13, further comprising an electromechanical actuator configured to actuate the sampler valve.

22. The fluid sampler tool of claim 21, in which the electromechanical actuator comprises at least one of a group consisting of a solenoid and a motor.

23. The fluid sampler tool of claim 21, in which the electromechanical actuator is enclosed within the control module.

\* \* \* \* \*